(12) United States Patent
Lorch

(10) Patent No.: US 6,454,175 B1
(45) Date of Patent: *Sep. 24, 2002

(54) THERMOSTATIC VALVE

(75) Inventor: Werner Lorch, Schramberg (DE)

(73) Assignee: Hansgrohe AG, Schiltach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/484,518

(22) Filed: Jan. 18, 2000

(51) Int. Cl.$^7$ .............................................. G05D 23/13
(52) U.S. Cl. .................................. 236/12.2; 137/625.41
(58) Field of Search ............................ 236/12.2, 12.16; 137/625.41

(56) References Cited

U.S. PATENT DOCUMENTS

| | | | | |
|---|---|---|---|---|
| 3,674,048 A | * | 7/1972 | Manoogian et al. | 137/625.41 |
| 4,349,149 A | * | 9/1982 | Humpert | 236/12.16 |
| 4,823,841 A | * | 4/1989 | Graber | 137/625.41 |
| 5,100,565 A | * | 3/1992 | Fujiwara et al. | 137/625.41 |
| 5,340,018 A | * | 8/1994 | MacDonald | 236/12.2 |
| 5,368,071 A | * | 11/1994 | Hsieh | 137/625.41 |
| 5,931,374 A | * | 8/1999 | Knapp | 236/12.2 |
| 6,089,462 A | * | 7/2000 | Osvaldo | 236/12.2 |

FOREIGN PATENT DOCUMENTS

| | | |
|---|---|---|
| DE | 29 13 342 A1 | 10/1979 |
| DE | 43 38 701 A1 | 5/1995 |
| DE | 44 09 498 A1 | 9/1995 |
| DE | 195 08 362 C1 | 10/1996 |
| FR | 13 10 027 | 10/1968 |
| GB | 2 076 127 | 11/1981 |

* cited by examiner

Primary Examiner—William E. Tapolcai
(74) Attorney, Agent, or Firm—Duane Morris LLP

(57) ABSTRACT

A thermostatic valve contains a control system comprising two disks for the quantity control. One of the two disks is placed in fixed manner in the valve casing, whereas the second disk can be rotated. Each of the two disks contains an inlet opening for cold water and an inlet opening for hot water. These openings are made to coincide to a greater or lesser extent for the quantity control. In addition, each of the control disks contains a subdivided outlet opening for the mixed water leaving the valve. On rotating the valve there is also a modification of the flow cross-section of the outlet opening. This is also brought about by a greater or lesser coincidence of the openings.

8 Claims, 3 Drawing Sheets

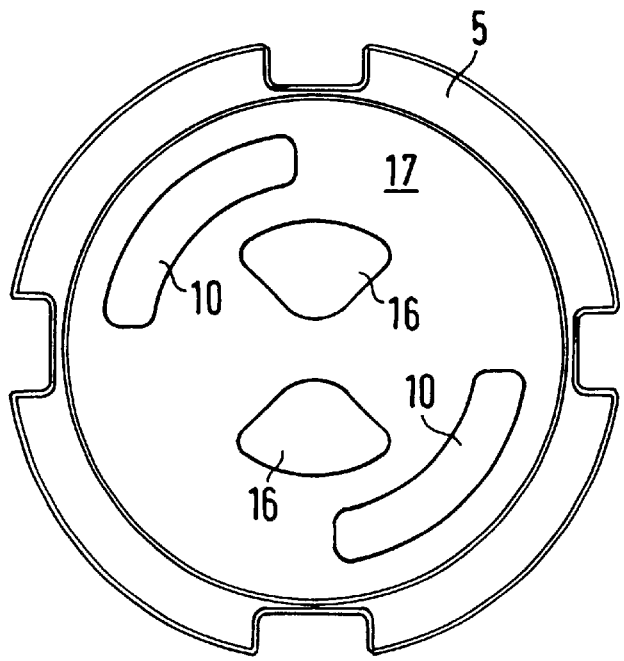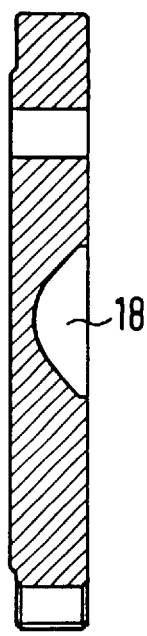
FIG.6   FIG.7
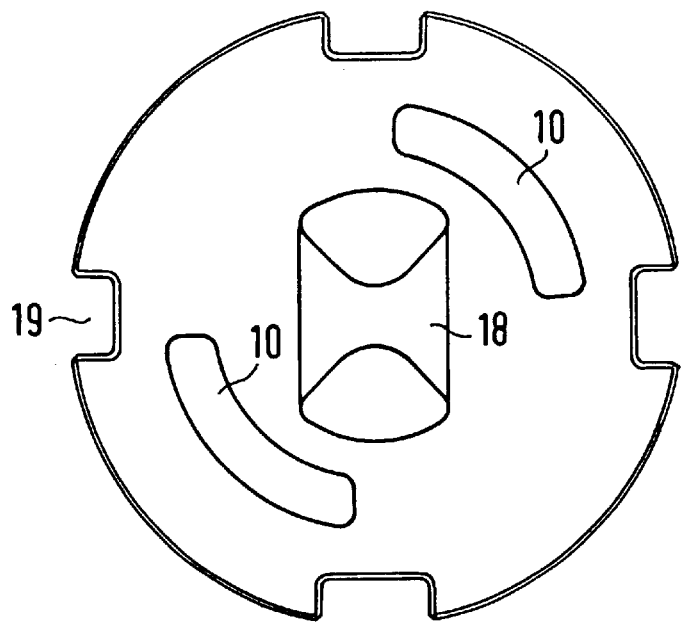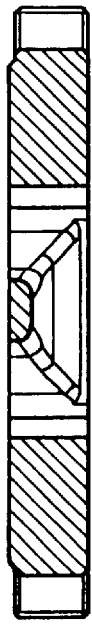
FIG.8   FIG.9

THERMOSTATIC VALVE

Thermostatic valves are known. They contain an expansion element located in the mixed water and regulate the temperature of the latter. A control or operating member is provided for setting the desired temperature. A second control or operating member is used for opening and closing the valve.

The problem of the invention is to provide a compactly constructed, quiet fitting having a thermostat.

According to the invention this problem is solved by a thermostatic valve having the features of claim 1. Further developments of the invention form the subject matter of the dependent claims, whose wording, like that of the abstract, is by reference made into part of the content of the description.

The thermostatic valve proposed by the invention is constructed in such a way that the mixed water outlet is restricted, so that the valve operates quietly.

According to a further development of the invention, the mixed water outlet is restricted in that the flow cross-section of said outlet is smaller than the sum of the flow cross-sections of the cold water inlet and the hot water inlet. Thus, restriction essentially only takes place in the valve control.

According to a further development of the invention, the cross-section of the inlets into the valve and the cross-section of the outlet from the valve are modified for quantity control purposes.

According to another development of the invention, on closing the valve the outlet is closed before the inlet. This measure also contributes to the restricting of the valve.

The invention proposes that the water flows axially into the valve and leaves the latter axially again.

According to a further development of the invention, the valve has a disk control, in which two disks are provided, which engage on one another in a common control surface, one of the two disks being slidable or rotatable with respect to the other.

According to the invention, on entering and leaving the valve, the water passes through the disk control.

According to the invention, the quantity control is brought about by turning one control disk.

Figure 1:
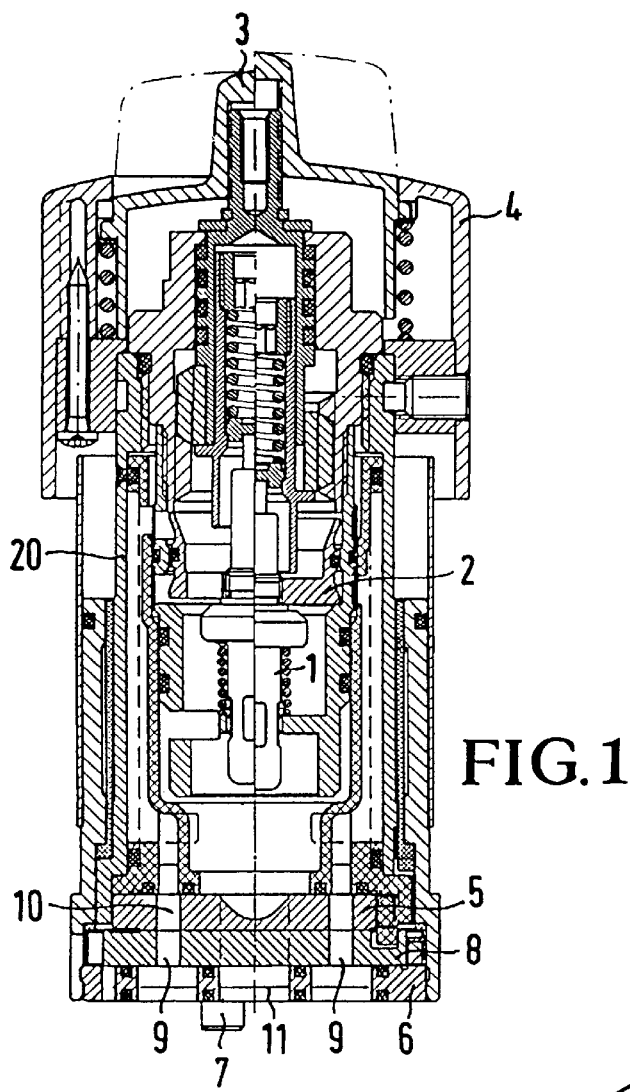
Figure 10:
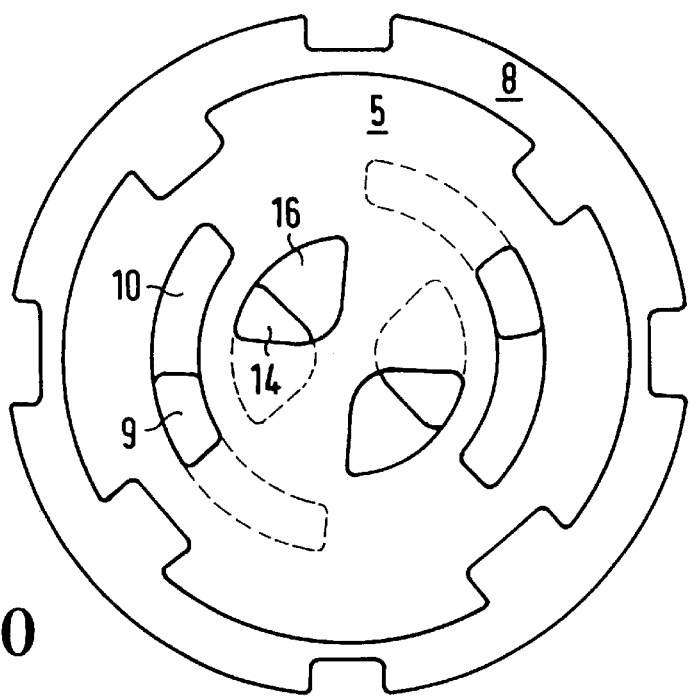
Figure 2:
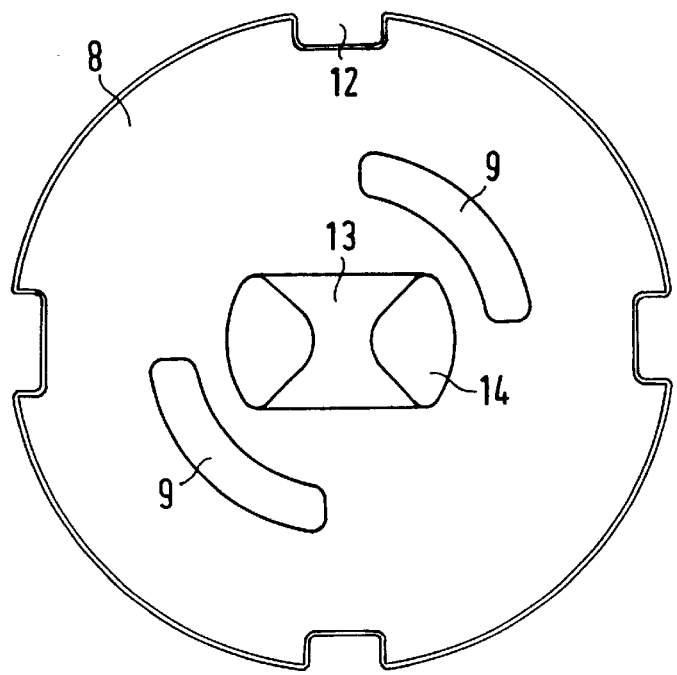
Figure 3:
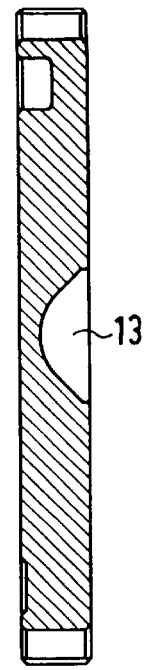
Figure 4:
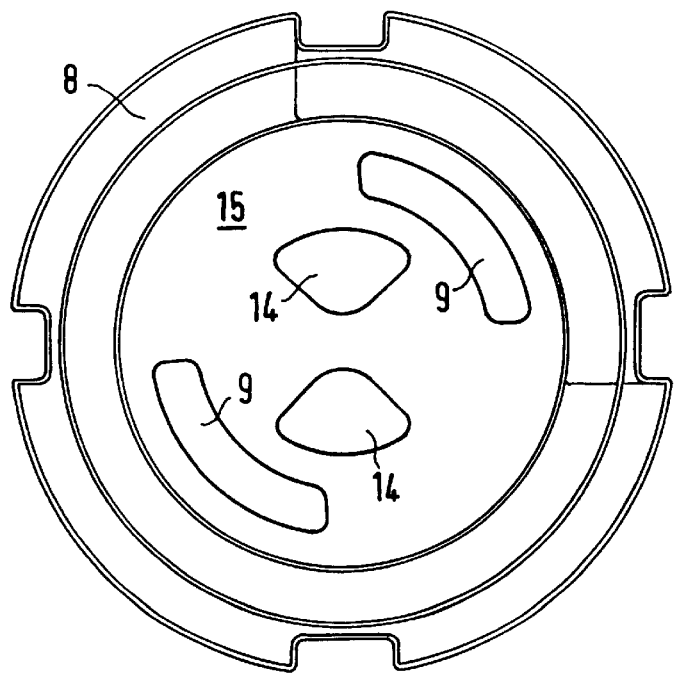
Figure 5:
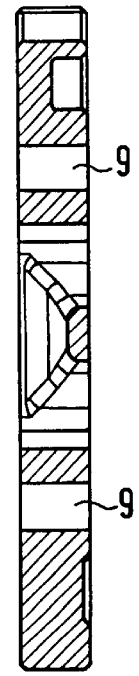

Further features, details and advantages of the invention can be gathered from the following description of a preferred embodiment and the attached drawings, wherein show:

FIG. 1 An axial section through a thermostatic valve according to the invention.
FIG. 2 A view of a fixed control disk from below.
FIG. 3 A section through the fixed control disk of FIG. 2.
FIG. 4 A view of the control disk of FIG. 2 from above.
FIG. 5 A further section through the control disk of FIGS. 2 and 4.
FIG. 6 A view of the movable control disk from below.
FIG. 7 A section through the movable control disk.
FIG. 8 A view of the movable control disk of FIG. 6 from above.
FIG. 9 A second section through the movable control disk.
FIG. 10 Diagrammatically a plan view of the two control disks with a partly opened valve.

FIG. 1 is an axial section through a thermostatic valve, as proposed by the present invention. The valve is constructed as a valve cartridge and can be inserted in the manner shown into a fitting body, which is not shown for reasons of simplification. The valve contains an expansion element 1, which controls a thermostatic valve 2. For preventing the starting position of the thermostatic valve a first control or operating member 3 is provided, which in the represented embodiment passes centrally through a second control or operating member 4. A movable control disk 5 can be rotated with the aid of the second operating member 4.

The valve cartridge contains a base 6, which seals the cartridge on its side intended for insertion in the fitting body. The cartridge base 6 contains a centring shoulder 7. Immediately above the base is located a fixed control disk 8, which is e.g. made from a ceramic material. On the fixed control disk 8 is located the movable control disk 5, which can be rotated with the aid of the operating member 4. The fixed control disk 8 has two openings 9, whereof one opening 9 is intended for cold water and the other opening 9 for hot water. In a similar manner the rotary control disk 5 has two openings 10. The connections of the openings 9 of the fixed control disk 8 to the connections of the fitting body takes place with the aid of the base 6, which has several sealed ports. The fitting operates in such a way that the cold and hot water flows through the openings 9 and 10 into the interior of the valve, the valve element 2 bringing about the desired mixing ratio between the hot and cold water. The mixed water flows through an opening of the movable control disk 5, which is not shown in FIG. 1, into an also not shown opening of the fixed control disk 8 and from there through a central opening 11 of the base 6 into the corresponding channel of the fitting body.

FIGS. 2 to 5 show details of the fixed control disk 8, which is also referred to as a distributor disk. FIG. 2 is a view of said disk from below, i.e. from the direction of the base 6. The openings 9 for the cold and hot water are constructed as arcuate slots with coaxial outer and inner edges. Both openings extend over somewhat less than a quadrant. On the outside of the circular distributor disk 8 are provided four notches 12 serving to correctly position the distributor disk 8 in the cartridge.

In the centre of the distributor disk 8 is provided a depression 13, which is linked by means of two ports 14 to the opposite side visible in FIG. 4. These two ports 14 are roughly shaped like a rounded circular sector and are symmetrical to a first diameter and on a second diameter perpendicular thereto.

FIG. 3 is a section through the distributor disk 8 positioned in such a way that the depression 13 is visible.

FIG. 4 shows the surface 15 of the distributor disk 8 facing the movable control disk 5. It can be seen that the two ports 14 in said surface issue in the form of separate openings.

In similar representations FIGS. 6 to 9 show the movable control disk 5, FIGS. 6 to 9 being on the same scale as FIGS. 2 to 5. At a first glance it is possible to see that the arrangement of the ports 10 for cold and hot water is the same as the arrangement for the distributor disk 8. This also applies with regards to the ports 16 issuing in the underside 17 of the movable control disk 5. On the opposite top surface shown in FIG. 8 said ports 16 pass into a depression 18, which corresponds to the distributor disk depression 13. Here again there are notches 19 in order to maintain a correct positioning of the movable control disk 5 in the cage 20, which transfers the rotary movement of the operating member 4 to the control disk 5.

In the assembled state of the valve control the distributor disk side 15 shown in FIG. 5 engages on the underside 17 of the movable control disk 5 shown in FIG. 6. The control is constructed in such a way that both on entering and leaving the control, the water passes through the openings of both control disks. The flow cross-section of both the inlet and the outlet is modified by rotating the movable control disk 5. This is diagrammatically illustrated in FIG. 10, which shows the two control disks placed on one another in a specific angular position. Both the inlet openings 9, 10 and the outlet openings 16, 14 overlap to a greater or lesser extent, as a function of the position of the movable control disk 5. This means that a change to the flow cross-section in the quantity control takes place both on entering and leaving the valve. This ensures that the flow cross-section of the outlet is always smaller than the flow cross-section of the inlets and e.g. assumes a value of two thirds.

What is claimed is:

1. Thermostatic valve, comprising a fitting body, a cold water inlet leading into the fitting body, a hot water inlet leading into the fitting body, a mixed water outlet passing out of the fitting body, said mixed water outlet defining a flow path, a thermostat for determining the mixed water temperature, and a quantity control valve, wherein the flow path of the mixed water outlet from the valve is restricted and has a cross-sectional area that is reduced and enlarged together with the cold water inlet and the hot water inlet; and, wherein the flow cross-section of the mixed water outlet remains smaller than the sum of the flow cross-sections of the cold water inlet and the hot water inlet as said cross-sectional area is reduced and enlarged together with the cold water inlet and the hot water inlet.

2. Thermostatic valve according to claim 1, wherein the outlet is closed before the inlets on closing the valve.

3. Thermostatic valve according to claim 1, wherein the entry into the valve an the exit from the valve take place axially.

4. Thermostatic valve according to claim 1, wherein the quantity control valve has a disk control.

5. Thermostatic valve according to claim 1, wherein the water to be controlled passes through the quantity control on entering and leaving the valve.

6. Thermostatic valve according to claim 4, wherein the quantity control takes place through a rotation of the movable control disk.

7. Thermostatic valve according to claim 1, wherein the cold water inlet, the hot water inlet and the mixed water outlet are defined by openings in a movable control disk that are alignable with openings in a fixed disk.

8. Thermostatic valve according to claim 7, wherein the cold water inlet and the hot water inlet are proportionally coupled to the mixed water outlet by operation of the control disk; wherein the mixed water outlet is defined by openings in the control disk and the fixed disk that correspond to the openings defining the cold water inlet and the hot water inlet; and, wherein the openings of the mixed water outlet have a restricted cross section compared to the openings defining the cold water inlet and the hot water inlet, at all positions of the control disk.

* * * * *